Figure 3:
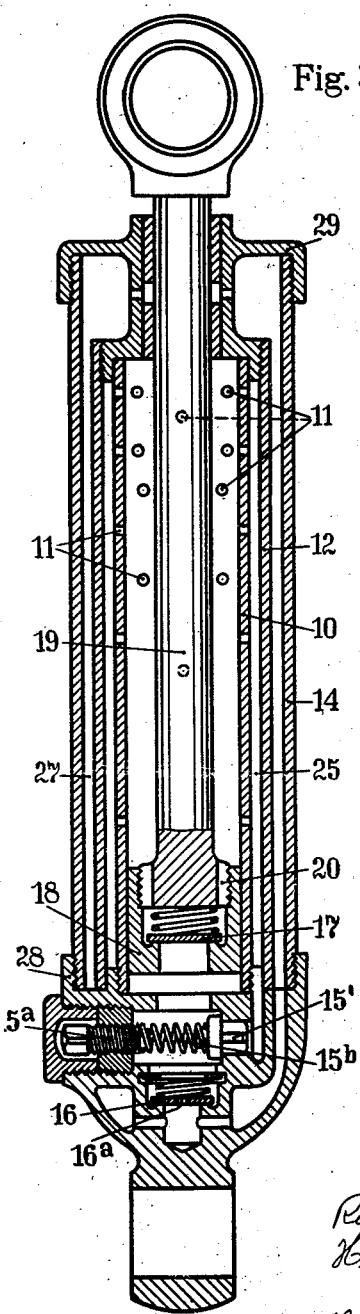

Sept. 19, 1939.   R. BINDER ET AL   2,173,574
SLIDE-CONTROLLED HYDRAULIC SHOCK ABSORBER
Filed May 12, 1937   2 Sheets-Sheet 1
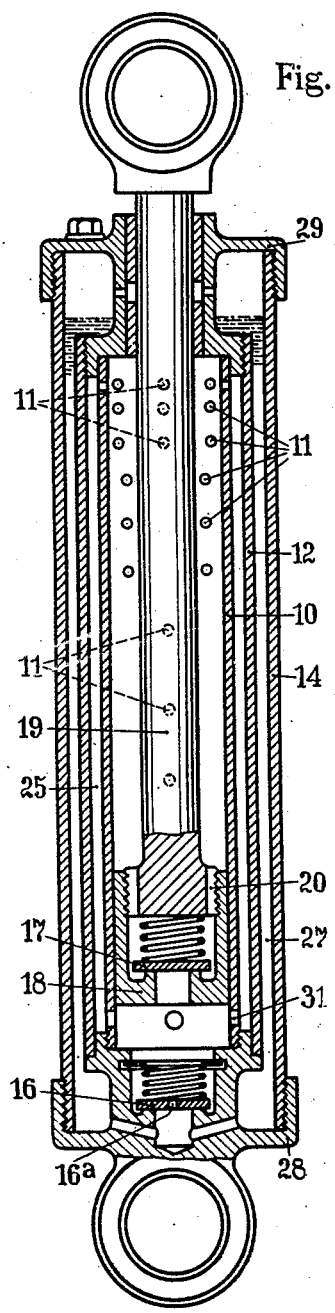
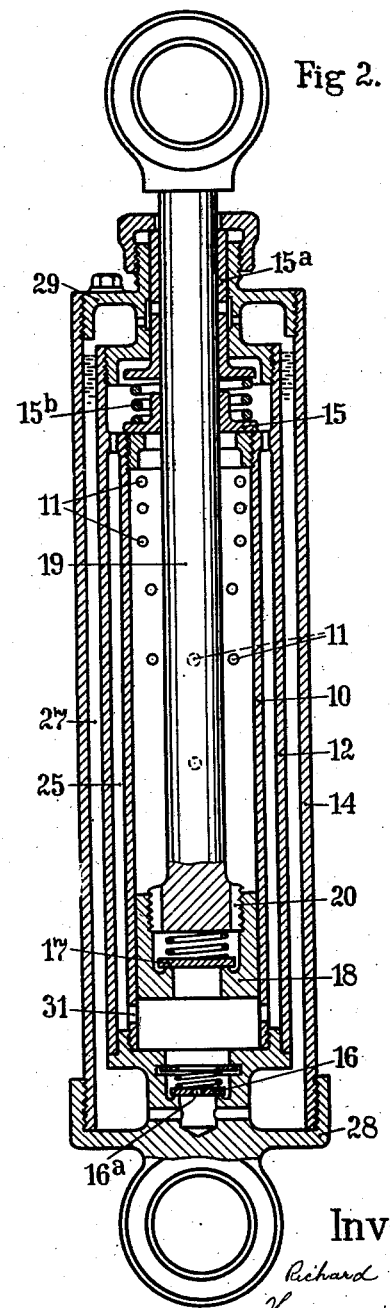
Inventors
Richard Binder
Hermann Klein
By: Wean, Fairbank, Hirsch & Foster
Attorneys Patented Sept. 19, 1939

2,173,574

UNITED STATES PATENT OFFICE 2,173,574

SLIDE-CONTROLLED HYDRAULIC SHOCK ABSORBER

Richard Binder and Hermann Klein, Schweinfurt, Germany

Application May 12, 1937, Serial No. 142,091
In Germany May 16, 1936

6 Claims. (Cl. 188—88)

This invention relates to double-acting hydraulic shock absorbers of substantially tubular construction, comprising a pump and means for conveying and controlling the working fluid therein. This shock absorber is particularly designed to damp the oscillations of spring-supported parts of vehicles, such as automobiles.

The object of the invention is to obtain a calm or soft checking of the rocking movement at the end of every stroke of the piston and thus to damp the oscillations of a spring-supported body or member of a vehicle.

This object is attained by the arrangement of a plurality of perforations or ports distributed lengthwise in the wall of the pump cylinder which ports interconnect the interior of the pump with a by-pass or return passage conveying the working liquid back to the opposite end of the pump. It is a substantial feature that the piston of the pump covers and uncovers the said ports during its stroke and particularly near the end thereof so that the damping effect may be regulated as desired.

Other features will appear from the sequent description and be claimed in the closing claims.

In the accompanying drawings, which form a part of this specification, three embodiments of the invention are illustrated by way of example. In the drawings—

Fig. 1 is a vertical sectional view of a shock absorber according to the invention, Figs. 2 and 3 are similar but modified constructions of the shock absorber.

Like numerals designate like or similar parts throughout all figures of the drawings.

As shown in Fig. 1, the pump cylinder 10 is surrounded by the cylindrical wall 12 of a by-pass or return chamber 25 in turn disposed within the cylindrical wall 14 of a receiver or compensating chamber 27. The said return chamber is adapted to afford the communication between the top and bottom ends of said pump cylinder 10 as stated hereinafter. In a foot piece 28 interconnecting the lower ends of the tubular walls 10, 12 and 14 is located a check or valve 16 between the pump and the compensating chamber 27. A perforation 16a made in the body or disc 16 allows of the passage of a given amount of working liquid from the pump to the compensating chamber 27 under pressure when the valve is closed.

Lengthwise distributed in the wall of the pump cylinder 10 there is a plurality of perforations or ports 11 of any shape and arranged on a special disposition. Through these holes or ports 11 the damping liquid passes from the pump into the return chamber 25 which is connected with the lower end of the pump through a few larger ports 31.

The upper ends of the tubes 10, 12 and 14 are connected and closed by a head piece 29 in which the rod 19 of a piston 18 is guided when moving upwards and downwards. A non-return valve 17 and axial channels 20 provided in the piston 18 only allow the passage therethrough when the piston moves downwards.

Suppose the pump cylinder 10 and the return chamber 25 to be entirely filled with the working liquid, such as oil, while the receiver or compensating chamber 27 requires to be only partially filled, the operation of shock absorber is as follows.

As the piston 18 is moved in the upward direction, beginning from the position shown in Fig. 1 in which all perforations 11 are uncovered while the non-return valve 17 stands closed, the liquid filling the pump space above the piston 18 will be forced through the perforations 11 into the return conduit 25; from there it will pass through ports 31 into the space below the piston. However, since the volume of the upper pump space, owing to the piston rod 19 being therein enclosed, is smaller than that of the lower space, a certain amount of liquid will be drawn out of the compensating chamber 27 through the valve 16 into the lower pump space. In its further upward movement the piston will gradually act as a slide valve and cover the perforations 11 thereby reducing the total sectional area of passage afforded by the perforations 11 to such an amount that the increased damping effect results in a soft stopping of the oscillating movement without shock. The combined areas of the perforations 11 in successive longitudinal sections of the cylinder 10 from substantially the middle to the upper end thereof increase progressively, so that the rate of acceleration in the retardation of the piston 18 is lower than it would be if the combined areas of these perforations were equal for successive sections of the upper half of said cylinder.

By the subsequent downward movement of the piston and piston rod the perforations 11 are uncovered, while the admission of the liquid into the upper space will take place through the piston, the valve 17 mounted therein being lifted by the liquid pressure exerted to its lower face. The excess of liquid will not be received in the upper pump space, but refunded to the compensating chamber 27 through the small opening 16a of the valve 16, thereby also damping the downward displacement of the piston.

The modification of the shock absorber shown in Fig. 2 is completed by a safety valve 15 pressed upon its seat by a strong spring 15b actuated through an adjustable support 15a. This resilient valve is provided to release the device from undue pressures generated in the liquid by extraordinarily heavy shocks and is disposed at the upper end of the pump cylinder 10 so that it operates in parallel with the control effected by the perforations 11.

In Fig. 3 a shock absorber having a similar safety valve 15' disposed in the lower end of the by-pass 25 is illustrated. Said valve is held in its closed position by a spring 15b the pressure of which can be regulated through an adjustable screw 15a and it operates in series with the perforations 11 to release the device from undue pressures generated into liquid by heavy shocks.

In the constructions of Figs. 1, 2 and 3, the pump cylinder has a plurality of perforations longitudinally arranged in spaced relationship, and so distributed as to normally provide a substantially constant rate of retardation of the piston 18 in its upward movement in the lower half of said pump cylinder, and a progressively increased rate of retardation in its upward movement in the upper half of said pump cylinder. For that purpose, all or at least most of the perforations are arranged from approximately the middle of the pump cylinder to the upper end thereof through which the piston rod extends. In the lower half of the pump cylinder, the perforations are either small in number as compared with those provided in the upper half of the cylinder as shown in the constructions of Figs. 1 and 3, in which one or two apertures are provided in said lower half, or said perforations are entirely absent from said lower half as in the construction of Fig. 2.

We claim:

1. A liquid operated double acting shock absorber comprising a pump cylinder, a piston reciprocable therein, a rod connected to said piston and extending through one end of said cylinder, said piston having a non-return valved passage therein, a cylindrical return chamber concentrically enclosing said pump cylinder and communicating at its ends with approximately opposite ends of said pump cylinder respectively, a compensating chamber concentrically enclosing said return chamber, and a valve located near the other end of said pump cylinder between said pump cylinder and compensating chamber, and automatically moved into open position only by the movement of said piston away from said valve, said pump cylinder having a plurality of perforations longitudinally arranged in space relationship and so distributed as to normally provide a substantially constant rate of retardation of the piston in its upward movement in the lower half of said pump cylinder, and a progressively increased rate of retardation in its upward movement in the upper half of said pump cylinder, the combined areas of said perforations in successive longitudinal sections of said cylinder in its upper half increasing progressively to the upper end of said pump cylinder.

2. A liquid operated double acting shock absorber comprising a pump cylinder, a piston reciprocable therein, a rod connected to said piston and extending through one end of said cylinder, said piston having a non-return valved passage therein, a cylindrical return chamber concentrically enclosing said cylinder and communicating at its ends with approximately opposite ends of said pump cylinder respectively, a compensating chamber concentrically enclosing said return chamber, and a disc valve located near the other end of said pump cylinder between said pump cylinder and said compensating chamber and automatically moved into open position only by the movement of said piston away from said valve, said valve having a by-pass permitting recharging of the compensating chamber during the movement of said piston towards said valve, said pump cylinder having a plurality of perforations longitudinally arranged in space relationship and so distributed as to normally provide a substantially constant rate of retardation of the piston in its upward movement in the lower half of said pump cylinder, and a progressively increased rate of retardation in its upward movement in the upper half of said pump cylinder, the combined areas of said perforations in successive longitudinal sections of said cylinder in its upper half increasing progressively to the upper end of said pump cylinder.

3. A liquid operated double acting shock absorber comprising a pump cylinder, a piston reciprocable therein, a rod connected to said piston and extending through one end of said cylinder, said piston having a non-return valved passage therein, a cylindrical return chamber concentrically enclosing said cylinder and communicating at its ends with approximately opposite ends of said pump cylinder respectively, a compensating chamber concentrically enclosing said return chamber, a valve located near the other end of said pump cylinder, between said pump cylinder and said compensating chamber, and automatically moved into open position only by the movement of said piston away from said valve, said pump cylinder having a plurality of perforations longitudinally arranged in space relationship and so distributed as to normally provide a substantially constant rate of retardation of the piston in its upward movement in the lower half of said pump cylinder, and a progressively increased rate of retardation in its upward movement in the upper half of said pump cylinder, the combined areas of said perforations in successive longitudinal sections of said cylinder in its upper half increasing progressively to the upper end of said pump cylinder, and a safety valve for releasing the absorber from undue pressures generated in the liquid by heavy shocks.

4. A liquid operated double acting shock absorber comprising a pump cylinder, a piston reciprocable therein, a rod connected to said piston and extending through one end of said cylinder, said piston having a non-return valved passage therein, a cylindrical return chamber concentrically enclosing said cylinder and communicating at its ends with approximately opposite ends of said pump cylinder respectively, a compensating chamber concentrically enclosing said return chamber, and a valve located near the other end of said pump cylinder, between said pump cylinder and said compensating chamber and automatically moved into open position only by the movement of said piston away from said valve, said pump cylinder having a plurality of perforations longitudinally arranged in space relationship and so distributed as to normally provide a substantially constant rate of retardation of the piston in its upward movement in the lower half of said pump cylinder, and a progressively increased rate of retardation in its upward movement in the upper half of said pump cylinder, the combined areas of said perforations in successive longitudinal sections of said cylinder in its upper half increasing progressively to the upper end of said pump cylinder, a non-return spring pressed safety valve to release the absorber from undue pressures generated in the liquid by heavy shocks, and means for selectively regulating the tension of the spring of said safety valve.

5. A liquid operated double acting shock absorber comprising a pump cylinder, a piston reciprocable therein, a rod connected to said piston and extending through one end of said cylinder, said piston having a non-return valved passage therein, a cylindrical return chamber concentrically enclosing said cylinder return chamber and communicating at its ends with approximately opposite ends of said pump cylinder respectively, a compensating chamber concentrically enclosing said return chamber, a valve located near the other end of said pump cylinder between said pump cylinder and said compensating chamber, and automatically moved into open position only by the movement of said piston away from said valve, said pump cylinder having a plurality of perforations longitudinally arranged in space relationship and so distributed as to normally provide a substantially constant rate of retardation of the piston in its upward movement in the lower half of said pump cylinder, and a progressively increased rate of retardation in its upward movement in the upper half of said pump cylinder, the combined areas of said perforations in successive longitudinal sections of said cylinder in its upper half increasing progressively to the upper end of said pump cylinder, and a spring pressed safety valve disposed at one end of the pump cylinder, and operable in parallel with the control effected by said perforations to release said pump cylinder from undue pressures generated in the liquid therein by heavy shocks, said safety valve including a valve plate encircling said piston rod and slidable relatively therealong and a spring acting on said plate, and a rotatable member for adjusting the tension of said spring.

6. A liquid operated double acting shock absorber comprising a pump cylinder, a piston reciprocable therein, a rod connected to said piston and extending through one end of said cylinder, said piston having a non-return valved passage therein, a cylindrical return chamber concentrically enclosing said cylinder and communicating at its ends with approximately opposite ends of said pump cylinder respectively, a compensating chamber concentrically enclosing said return chamber, a valve located near the other end of said pump cylinder between said pump cylinder and said compensating chamber and automatically moved into open position only by the movement of said piston away from said valve, said pump cylinder having a plurality of perforations longitudinally arranged in space relationship and so distributed as to normally provide a substantially constant rate of retardation of the piston in its upward movement in the lower half of said pump cylinder, and a progressively increased rate of retardation in its upward movement in the upper half of said pump cylinder, the combined areas of said perforations in successive longitudinal sections of said cylinder in its upper half increasing progressively to the upper end of said pump cylinder, and a non-return adjustable safety valve disposed near one end of said return chamber and operable in series with said perforations to release the absorber from undue pressures generated in the liquid by heavy shocks.

RICHARD BINDER
HERMANN KLEIN.